US011280725B2

(12) United States Patent
Nihey (10) Patent No.: US 11,280,725 B2
(45) Date of Patent: Mar. 22, 2022

(54) MEASUREMENT DEVICE, MEASUREMENT METHOD, AND PROGRAM (71) Applicant: NEC CORPORATION, Tokyo (JP)

(72) Inventor: Fumiyuki Nihey, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/648,970

(22) PCT Filed: Sep. 29, 2017

(86) PCT No.: PCT/JP2017/035425
§ 371 (c)(1),
(2) Date: Mar. 19, 2020

(87) PCT Pub. No.: WO2019/064477
PCT Pub. Date: Apr. 4, 2019

(65) Prior Publication Data
US 2020/0284718 A1 Sep. 10, 2020

(51) Int. Cl.
G01N 21/33 (2006.01)

(52) U.S. Cl.
CPC .................... G01N 21/33 (2013.01)

(58) Field of Classification Search
CPC ........ G01N 21/33; B82Y 10/00; B82Y 30/00; B82Y 40/00; C01B 2202/02; C01B 2202/04; C01B 2202/06; C01B 2202/28; C01B 2202/30; C01B 32/156; C01B 32/17; C01B 32/174; C01B 32/18; C01P 2002/88; C01P 2004/03; C01P 2004/13; C01P 2006/80; C09C 1/48; C09C 1/56; H01L 51/0048

USPC .................................................. 356/409–412
See application file for complete search history.

(56) References Cited

U.S. PATENT DOCUMENTS

| 2008/0008643 | A1  | 1/2008  | Landi et al. |
| 2010/0240141 | A1* | 9/2010  | Nakano ................. G01N 21/80 436/163 |
| 2011/0312914 | A1* | 12/2011 | Kano ................... A61K 31/724 514/58 |
| 2013/0168543 | A1  | 7/2013  | Barron et al. |
| 2014/0009751 | A1* | 1/2014  | Pezzaniti ............. G01N 21/314 356/70 |
| 2016/0139057 | A1* | 5/2016  | Morimoto ............ G01N 21/359 356/402 |

FOREIGN PATENT DOCUMENTS

| JP | 05-209826 A   | 8/1993  |
| JP | 2004-276363 A | 10/2004 |
| JP | 2011-185613 A | 9/2011  |

OTHER PUBLICATIONS

International Search Report for PCT/JP2017/035425, dated Dec. 19, 2017.

* cited by examiner

Primary Examiner — Tri T Ton
(74) Attorney, Agent, or Firm — Sughrue Mion, PLLC (57) ABSTRACT A measurement device includes: a measurement unit which is configured to measure an absorption spectrum of a dispersion liquid in which nanocarbons are dispersed; a separation unit which is configured to separate an absorption spectrum of a dispersant from the absorption spectrum of the dispersion liquid; and a calculation unit which is configured to calculate a concentration of the dispersant from the absorption spectrum of the dispersant.

12 Claims, 5 Drawing Sheets

MEASUREMENT DEVICE, MEASUREMENT METHOD, AND PROGRAM

CROSS REFERENCE TO RELATED APPLICATIONS

This application is a National Stage of International Application No. PCT/JP2017/035425 filed Sep. 29, 2017.

TECHNICAL FIELD

The present invention relates to a measurement device, a measurement method, and a program.

BACKGROUND ART

When carbon materials having a size in the nanometer range (hereinafter referred to as "nanocarbons") are manufactured, it is known that nanocarbons having different properties may be generated simultaneously in a manufacturing stage. Furthermore, separating nanocarbons having different properties which are generated simultaneously is known. As a process performed before separating nanocarbons having different properties, a process in which nanocarbons are dispersed in a dispersion medium using a dispersant to form a nanocarbon dispersion liquid may be performed. Since a nanocarbon dispersion liquid is in a liquid state, a nanocarbon dispersion liquid in a state of a dispersion liquid is often used as a material used in a coating/printing process.

For example, Patent Document 1 describes that, in order to separate nanocarbons having different properties, a carbon nanotube dispersion liquid in which monodispersity has been established by dispersing carbon nanotubes in a dispersion medium including a surfactant which is a dispersant is prepared and separated.

PRIOR ART DOCUMENTS

Patent Documents

[Patent Document 1] Japanese Unexamined Patent Application. First Publication No. 2011-185613

SUMMARY OF THE INVENTION

Problem to be Solved by the Invention

A concentration of a dispersant may be evaluated before, during, and after separation of nanotubes having different properties in some cases.

On the other hand, Patent Document 1 describes that, in order to evaluate monodispersity of a carbon nanotube dispersion liquid, the ratio between two peaks in an absorption curve of the carbon nanotube dispersion liquid is calculated.

However, since the monodispersity of the carbon nanotube dispersion liquid does not depend only on the concentration of the dispersant in the carbon nanotube dispersion liquid, the monodispersity of the carbon nanotube dispersion liquid is not necessarily correlated with the concentration of the dispersant in the carbon nanotube dispersion liquid.

For this reason, with the technique disclosed in Patent Document 1, it is difficult to evaluate the concentration of the dispersant in the carbon nanotube dispersion liquid.

The present invention provides a measurement device, a measurement method, and a program with which a concentration of a dispersant in a nanocarbon dispersion liquid can be evaluated easily.

Means for Solving the Problem

A measurement device according to a first example aspect includes: a measurement unit which is configured to measure an absorption spectrum of a dispersion liquid in which nanocarbons are dispersed; a separation unit which is configured to separate an absorption spectrum of a dispersant from the absorption spectrum of the dispersion liquid; and a calculation unit, which is configured to calculate a concentration of the dispersant from the absorption spectrum of the dispersant.

A measurement method according to a second example aspect includes: a step of measuring an absorption spectrum of a dispersion liquid in which nanocarbons are dispersed; a step of separating an absorption spectrum of a dispersant from the absorption spectrum of the dispersion liquid; and a step of calculating a concentration of the dispersant from the absorption spectrum of the dispersant.

A program according to a third example aspect causes a computer of a measurement device including a measurement unit which is configured to measure an absorption spectrum of a dispersion liquid in which nanocarbons are dispersed to execute: a step of separating an absorption spectrum of a dispersant from the absorption spectrum of the dispersion liquid; and a step of calculating a concentration of the dispersant from the absorption spectrum of the dispersant.

Effect of the Invention

The measurement device, the measurement method, and the program allow a concentration of a dispersant in a nanocarbon dispersion liquid to be evaluated easily.

EMBODIMENTS FOR CARRYING OUT THE INVENTION

Example Embodiment

In this example embodiment, nanocarbons refer to carbon materials mainly composed of carbon such as single-walled carbon nanotubes, double-walled carbon nanotubes, multi-walled carbon nanotubes, carbon nanohorns, carbon nanotwists, graphenes, and fullerenes.

A case in which a concentration of a dispersant in a dispersion liquid in which single-walled carbon nanotubes are dispersed is evaluated will be described in detail below as an example.

(Single-Walled Nanocarbon Tubes)

It is known that single-walled carbon nanotubes are divided into single-walled carbon nanotubes having two different properties, i.e., metallic single-walled carbon nanotubes and semiconducting single-walled carbon nanotubes in accordance with diameters of tubes and a winding configuration. If single-walled carbon nanotubes are synthesized using currently known manufacturing methods, single-walled carbon nanotube mixtures containing single-walled carbon nanotubes having metallic properties (hereinafter referred to "metallic single-walled carbon nanotubes") and single-walled carbon nanotubes having semiconductive properties (hereinafter referred to as semiconducting single-walled carbon nanotubes") in a statistical ratio of 1:2 are obtained.

(Single-Walled Carbon Nanotube Dispersion Liquid)

A single-walled carbon nanotube dispersion liquid in this example embodiment is a liquid in which a single-walled carbon nanotube mixture is dispersed in a dispersion medium. It is desirable that water or heavy water be used as a dispersion medium for the dispersion liquid. Furthermore, a mixed liquid of water and heavy water can also be used as the dispersion medium for the dispersion liquid. However, a dispersion medium such as an organic solvent and an ionic solution may be used as long as the dispersion medium can disperse single-walled carbon nanotubes.

As a dispersant which disperses a single-walled carbon nanotube mixture in a dispersion medium, nonionic surfactants, cationic surfactant, anionic surfactant, other dispersion auxiliary agents, or the like may be used. Particularly, it is desirable to use a nonionic surfactant. This nonionic surfactant will be described later.

An example embodiment of a measurement device will be described with reference to FIGS. 1 to 7.

Figure 1:
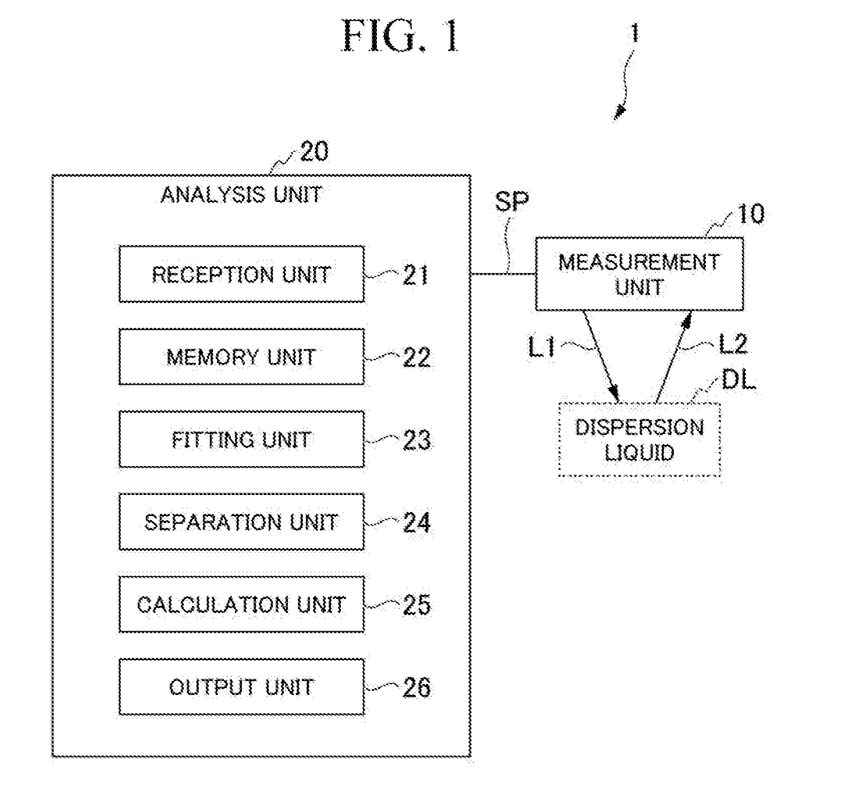
FIG. 1 is a block diagram of a measurement device according to an example embodiment.

A measurement device 1 can measure a concentration of a dispersant in a single-walled carbon nanotubes dispersion liquid.

As shown in FIG. 1, the measurement device 1 includes a measurement unit 10 and an analysis unit 20.

(Measurement Unit)

The measurement unit 10 measures an absorption spectrum of a dispersion liquid.

The measurement unit 10 irradiates irradiation light L including ultraviolet light to a dispersion liquid DL which is a CNT dispersion liquid and receives detection light L2 which is reflected light or transmitted light from the dispersion liquid DL. The measurement unit 10 scans the irradiation light L1 with a wavelength λ so that a wavelength dependence of an absorbance of the dispersion liquid DL is measured from the detected detection light 12.

The measurement unit 10 converts the wavelength λ into an energy E and acquires an energy dependence of the absorbance of the dispersion liquid DL as an absorption spectrum SP of the dispersion liquid DL. Here, the measurement unit 10 converts the wavelength λ into the energy E in accordance with the following expression (1).

$$\lambda(nm) = 1239.8/E \text{ (eV)} \qquad (1)$$

The measurement unit 10 transmits the acquired absorption spectrum SP of the dispersion liquid DL to the analysis unit 20.

(Analysis Unit)

The analysis unit 20 separates the absorption spectrum SP1 of the dispersant from the absorption spectrum SP of the dispersion liquid DL acquired from the measurement unit 10 and calculates a concentration of the dispersant from the absorption spectrum SP1 of the dispersant.

In this example embodiment, the analysis unit 20 functionally includes a reception unit 21, a memory unit 22, a fitting unit 23, a separation unit 24, a calculation unit 25, and an output unit 26.

The reception unit 21 receives the absorption spectrum SP of the dispersion liquid DL transmitted from the measurement unit 10.

The memory unit 22 stores each data processed in the reception unit 21, the fitting unit 23, the separation unit 24, the calculation unit 25, and the output unit 26.

The fitting unit 23 fits an absorption spectrum derived from single-walled carbon nanotubes.

The separation unit 24 separates the absorption spectrum SP1 of the dispersant from the absorption spectrum SP of the dispersion liquid DL.

The calculation unit 25 calculates the concentration of the dispersant from the absorption spectrum SP1 of the dispersant.

The output unit 26 outputs the calculated concentration of the dispersant to the outside of the analysis unit 20. At this time, the output unit 26 may display or print the calculated concentration of the dispersant and may transmit data itself concerning the calculated concentration of the dispersant to the outside.

Figure 2:
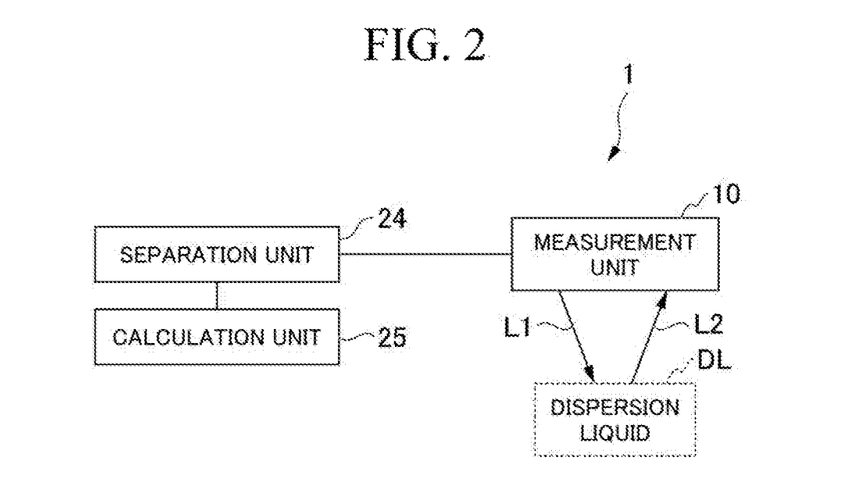
FIG. 2 is a block diagram of a minimum constitution of the measurement device according to the example embodiment.

Here. FIG. 2 shows a minimum constitution in the measurement device 1 configured to evaluate a concentration of the dispersant in the dispersion liquid DL. FIG. 2 shows the measurement unit 10, the separation unit 24, and the calculation unit 25 as the minimum constitution of the measurement device 1.

(Fitting Unit)

A fitting method in the fitting unit 23 will be described in detail with reference to FIG. 3.

Here, in order to explain the fitting method, a dispersion liquid DL was prepared as follows.

First, an aqueous solution obtained by dissolving polyoxyethylene (100) stearyl ether (trade name: Brij S100; manufactured by Sigma-Aldrich; hereinafter referred to as "Brij S100") which is a nonionic surfactant in water was prepared and used as a dispersion medium.

A single-walled carbon nanotube mixture (eDIPS single-walled carbon nanotubes) was dispersed in this dispersion medium. The liquid in which dispersion had been performed was subjected to ultrasonic dispersion treatment using a horn type ultrasonic crusher (an output of about 300 W for 30 minutes). After that, the liquid was subjected to an ultra-centrifugation operation and a supernatant corresponding to 50% of the liquid was obtained as a dispersion liquid DL.

Figure 3:
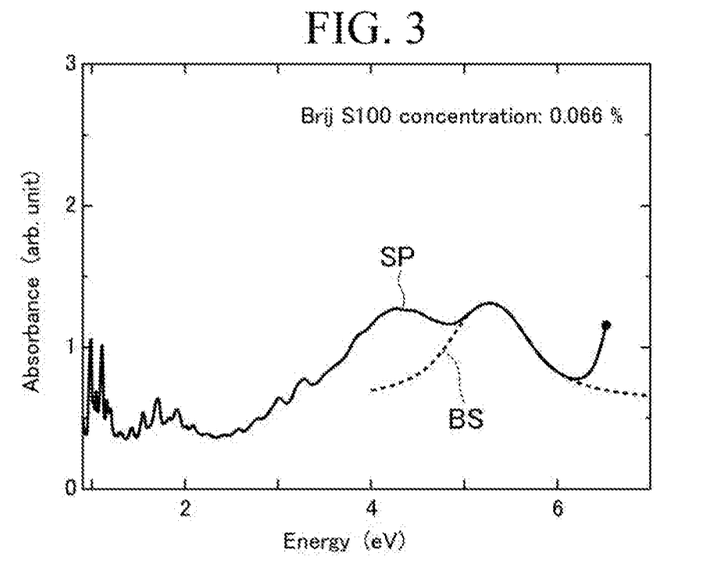
FIG. 3 is a graph for describing an absorption spectrum of a CNT dispersion liquid obtained using an aqueous solution obtained by dissolving 0.066 wt % of Brij S100 as a dispersion medium.

FIG. 3 shows an absorption spectrum SP of the dispersion liquid DL adjusted in this way measured by the measurement unit 10 using the dispersion liquid DL.

In this example embodiment, the fitting unit 23 fits an absorption spectrum in an energy range including a π plasmon absorption peak near 5.2 eV as an absorption spectrum derived from single-walled carbon nanotubes.

As shown in FIG. 3, the absorption spectrum SP of the dispersion liquid DL indicates an absorption peak (a π plasmon absorption peak) near 5.2 eV.

The fitting unit 23 performs function fitting in an energy range including an absorption peak near 5.2 eV.

Typically, function fitting is performed in the range of 5.1 eV<E<6.0 eV, but is not limited to this range.

The fitting unit 23 performs fitting in accordance with a fit equation FIT which is a function of the energy E. The fit equation FIT is a function including Gaussian function+Lorentz function+constant value. The fit equation FIT is represented by the following expression (2). The fit equation FIT has six parameters, i.e., %00, %01, %02, %03. %04, and %05 (FIT=FIT(%00, %01, %02, %03, %04, and %05)).

$$\text{FIT}=\%01*\exp(-(((E-\%02)*\%03)^2))+\%04/(((E-\%02)*\%05)^2+1)+\%00 \quad (2)$$

The fitting unit 23 searches for a point in which an error is minimized while changing values of the six parameters, i.e., %00 to %05 of the fit equation FIT.

First, initial values of the parameters are determined and an operation of determining a new parameter value from an error gradient in a parameter space at that time is repeatedly performed until the fit equation FIT converges. The error gradient is obtained using a partial differential equation of each of the parameters.

The partial differential equations of the parameters of the fit equation FIT are represented by the following expressions (3) to (8).

$$d\text{FIT}/d\%00=1 \quad (3)$$

$$d\text{FIT}/d\%01=\exp(-(((E-\%02)*\%03)^2)) \quad (4)$$

$$d\text{FIT}/d\%02=2*(E-\%02)*\%03^2*\exp(-(((E-\%02)*\%03)^2))+2*(E-\%02)*\%05^2*\%04/(((E-\%02)*\%05)^2+1)^2 \quad (5)$$

$$d\text{FIT}/d\%03=-2*\%03*(E-\%02)^2*\exp(-(((E-\%02)*\%03)^2)) \quad (6)$$

$$d\text{FIT}/d\%04=1(((E-\%02)*\%05)^2+1) \quad (7)$$

$$d\text{FIT}/d\%05=-2*\%05*(E-\%02)^2*\%04/((E-\%02)*\%05)^2+1)^2 \quad (8)$$

The fitting unit 23 acquires a curve represented by the fit equation FIT which has been subjected to convergence as a base curve BS. For example, FIG. 3 shows the base curve BS acquired on the basis of the absorption spectrum SP of the dispersion liquid DL. As a result of the fitting, 0.066% was obtained as a concentration of Brij S100. This result is consistent with concentrations obtained using other methods.

Figure 4:
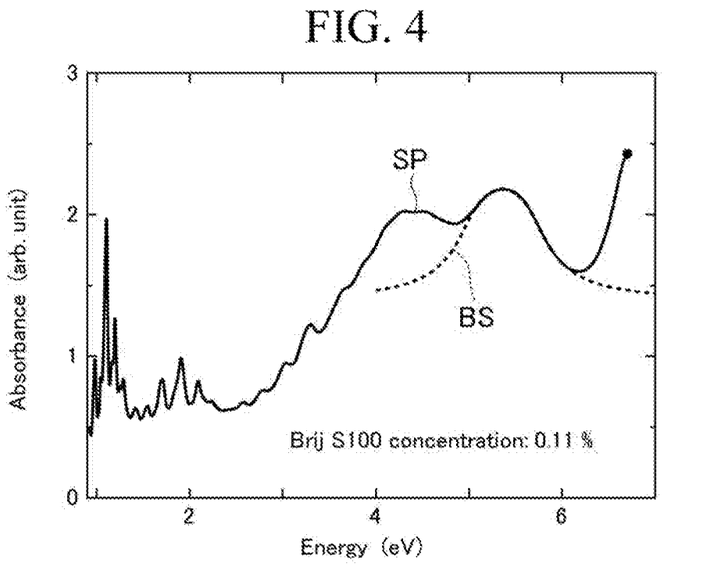
FIG. 4 is a graph for describing an absorption spectrum of a CNT dispersion liquid obtained using an aqueous solution obtained by dissolving 0.11 wt % of Brij S100 as a dispersion medium.

As another example, FIG. 4 shows an absorption spectrum SP of a dispersion liquid DL acquired using an aqueous solution obtained by dissolving Brij S100 having a different concentration as a dispersion medium through the same process as in the above example and an acquired base curve BS. As a result of the fitting, 0.11% is obtained as a concentration of Brij S100.

Although the fit equation FIT is a function including Gaussian function+Lorentz function+constant value, the fit equation FIT may be a function including Gaussian function+constant value or the fit equation FIT may be a function including Lorentz function+constant value term. Note that, in these cases, an error is slightly larger.

(Separation Unit)

The separation unit 24 will be described in detail.

As described above, the separation unit 24 separates the absorption spectrum SP1 of the dispersant from the absorption spectrum SP of the dispersion liquid DL The separation unit 24 subtracts the base curve BS acquired using the fitting unit 23 from the absorption spectrum SP of the dispersion liquid DL to acquire the absorption spectrum SP1 of the dispersant.

A lower limit in a range in which the separation unit 24 acquires the absorption spectrum SP1 of the dispersant is a lower limit in an energy range in which the fit equation FIT is subjected to fitting.

An upper limit in the range in which the separation unit 24 acquires the absorption spectrum SP1 of the dispersant is not particularly limited. Here, if the energy is too large, the absorbance tends to decrease. Thus, typically, any energy may be used as long as an energy of 7 eV or lower is selected.

Figure 5:
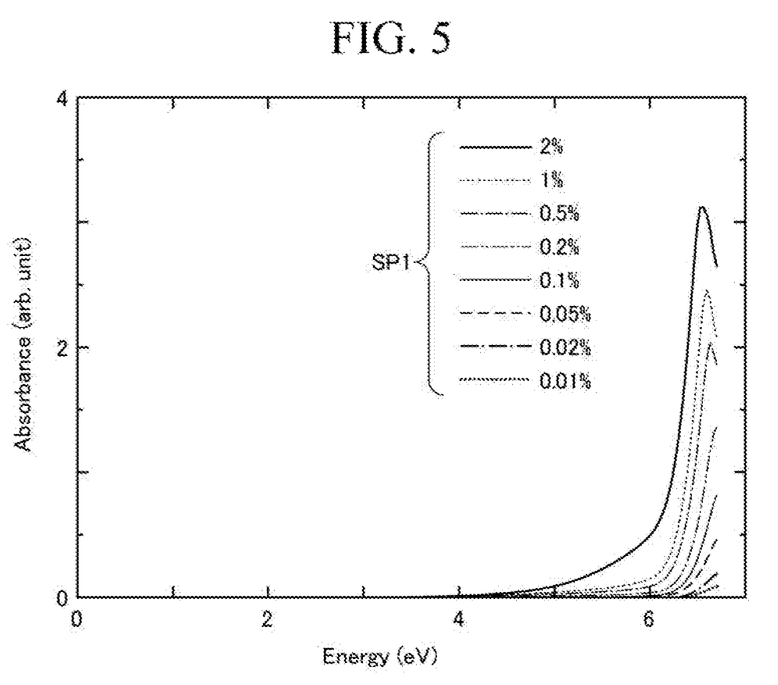
FIG. 5 is a graph for describing absorption spectra of aqueous Brij S100 solutions having different concentrations.

FIG. 5 shows absorption spectra SP1 of aqueous dispersant solutions adjusted by changing concentrations of Brij S100 which is a dispersant between 0.01% and 2%.

As can be seen from FIG. 5, it is found that, if the concentration of Brij S100 in the dispersion liquid DL increases, the absorption spectrum SP1 of the dispersant also rises and the absorption spectrum is significantly generated on a high energy side.

(Calculation Unit)

A method for calculating a concentration of a dispersion in the calculation unit 25 will be described in detail with reference to FIG. 6.

As described above, the calculation unit 25 calculates the concentration of the dispersant from an absorption spectrum SP1 of the dispersant.

Figure 6:
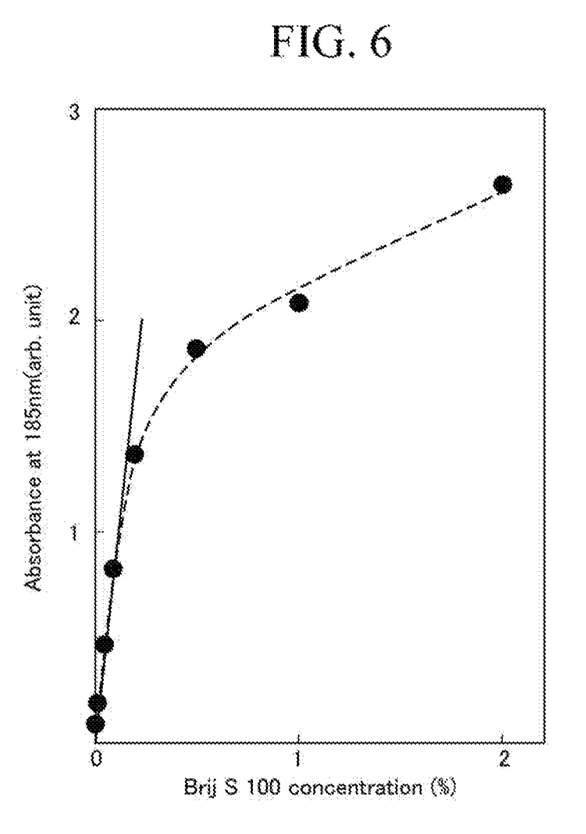
FIG. 6 is a graph for describing dependence of absorbance of an aqueous dispersant Brij S100 solution on a concentration of a dispersant.

In FIG. 6, an absorbance at an energy of 6.70 eV (an absorbance corresponding to a wavelength of 185 nm) in the absorption spectrum SP1 of each dispersant acquired by changing concentrations of Brij S100 dissolved in a dispersion medium shown in FIG. 5 between 0.01% and 2% is indicated using a black circle as a measurement point. A horizontal axis indicates a concentration of a dispersion medium and a vertical axis indicates an absorbance.

With regard to the measurement points acquired in this way, the calculation unit 25 acquires a fitting straight line as indicated by a solid line or a fitting curve as indicated by a dotted line in FIG. 6 and stores them in the memory unit 22 in advance.

Also, the calculation unit 25 acquires an absorbance at an energy of 6.70 eV (an absorbance corresponding to 185 nm) from the actually obtained absorption spectrum SP1 of the dispersant, and the calculation unit 25 calculates a concentration of the dispersant from the fitting straight line or the fitting curve indicating the absorbance with respect to the concentration of the dispersant stored in the memory unit 22.

(Measurement Method)

Figure 7:
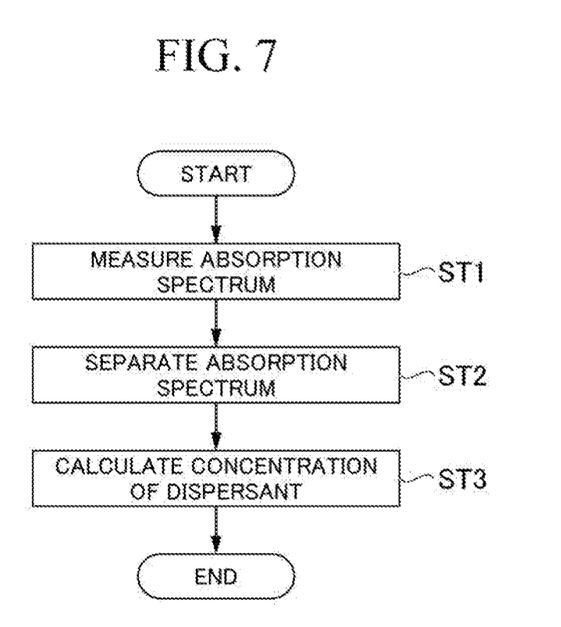
FIG. 7 is a flowchart for describing a measurement method according to an example embodiment.

A measurement method of a concentration of a dispersant using the measurement device 1 will be described with reference to FIG. 7.

First, an absorption spectrum SP of a dispersion liquid DL which is a CNT dispersion liquid is measured (ST1: a measurement step). At this time, the absorption spectrum SP of the dispersion liquid DL is measured by irradiating irradiation light L1 including ultraviolet light to the dispersion liquid DL and receiving detection light L2 which is reflected light or transmitted light from the dispersion liquid DL.

Subsequent to ST1, the absorption spectrum SP1 of the dispersant is separated from the absorption spectrum SP of the dispersion liquid DL (ST2: a separation step). At this time, the absorption spectrum SP1 of the dispersant is acquired by subtracting a base curve BS from the absorption spectrum SP of the dispersion liquid DL.

Subsequent to ST2, the concentration of the dispersant is calculated from the absorption spectrum SP1 of the dispersant (ST3: a calculation step). At this time, the concentration of the dispersant is calculated from the fitting straight line or the fitting curve indicating the absorbance with respect to the concentration of the dispersant.

(Action and Effect)

In this example embodiment, the measurement device 1 separates the absorption spectrum SP1 of the dispersant from the absorption spectrum SP of the dispersion liquid DL and calculates the concentration of the dispersant. For this reason, the measurement device 1 can measure an absorbance of a dispersant in a short wavelength region and can evaluate a concentration of the dispersant.

For example, a short wavelength region, i.e., 180 nm to 190 nm is a region in which absorption of the dispersant is significant. On the other hand, the short wavelength region, i.e., 180 nm to 190 nm is a region in which an absorption spectrum of a carbon nanotube monotonously changes regardless of whether being of a metallic or a semiconducting.

Therefore, it is easy to evaluate the concentration of the dispersant by numerically separating an absorption spectrum of the dispersant. Furthermore, it is possible to quantitatively evaluate the concentration of the dispersion liquid DL easily and precisely.

In this example embodiment, an example in which Brij S100 is used as a nonionic surfactant has been described. However, the nonionic surfactant is not limited thereto.

As the nonionic surfactant, one type or a combination of nonionic surfactants including a hydrophilic site which is not ionized and a hydrophobic site such as an alkyl chain can be used. For example, nonionic surfactants having a polyethylene glycol structure represented by a polyoxyethylene alkyl ether type, alkylglucoside type nonionic surfactants, and the like can be used. Furthermore, it is desirable that a nonionic surfactant defined by a polyoxyethylene (n) alkyl ether as represented by the following expression (9) (n is 20 or more and 100 or less and an alkyl chain length is C12 or higher and C18 or less) be used.

(where, n=12 to 18 and m=20 to 100).

Examples of the polyoxyethylene (n) alkyl ether include polyoxyethylene (23) lauryl ether (trade name: Brij L23; manufactured by Sigma-Aldrich), polyoxyethylene (20) cetyl ether (trade name: Brij C20; manufactured by Sigma-Aldrich), polyoxyethylene (20) stearyl ether (trade name: Brij S20; manufactured by Sigma-Aldrich), polyoxyethylene (10) oleyl ether (trade name: Brij O10; manufactured by Sigma-Aldrich), polyoxyethylene (10) cetyl ether (trade name: Brij C10; manufactured by Sigma-Aldrich), polyoxyethylene (10) stearyl ether (trade name: Brij S10; manufactured by Sigma-Aldrich), polyoxyethylene (20) oleyl ether (trade name: Brij O20; manufactured by Sigma-Aldrich), and the like.

Examples of the nonionic surfactant also include polyoxyethylene sorbitan monostearate (molecular expression: $C_{64}H_{126}O_{26}$; trade name: Tween 60; manufactured by Sigma-Aldrich), polyoxyethylene sorbitan trioleate (molecular expression: $C_{24}H_{44}O_6$; trade name: Tween 85; manufactured by Sigma-Aldrich), octylphenol ethoxylate (molecular expression: $C_{14}H_{22}O(C_2H_4O)_n$; n=1 to 10; trade name: Triton X-100; manufactured by Sigma-Aldrich), polyoxyethylene (40) isooctylphenyl ether (molecular expression: $C_8H_{17}C_6H_{40}(CH_2CH_2)_{40}H$; trade name: Triton X-405; manufactured by Sigma-Aldrich), poloxamers (molecular expression: $C_5H_{10}O_2$; trade name: Pluonic; manufactured by Sigma-Aldrich), polyvinylpyrrolidone (molecular expression: $(C_6H_9NO)_n$; n=5 to 100; manufactured by Sigma-Aldrich), and the like.

Although the dispersion liquid DL is adjusted by performing ultrasonic dispersion treatment using a horn type ultrasonic crusher (an output of about 300 W for 30 minutes) in this example embodiment, the method for preparing the dispersion liquid DL is not particularly limited and known methods may be used. For example, the ultrasonic dispersion treatment method is not limited to a horn type ultrasonic crusher and any ultrasonic treatment may be used as long as a single-walled carbon nanotube mixture can be dispersed in a dispersion medium by subjecting a liquid obtained by mixing the single-walled carbon nanotube mixture and the dispersion medium including a nonionic surfactant to ultrasonic treatment.

This ultrasonic treatment sufficiently separates an aggregated mixture of metallic single-walled carbon nanotubes and semiconducting single-walled carbon nanotubes and the dispersion liquid DL is obtained by uniformly dispersing the metallic single-walled carbon nanotubes and the semiconducting single-walled carbon nanotubes in the dispersion medium. In this case, the metallic single-walled carbon nanotubes and the semiconducting single-walled carbon nanotubes can be easily separated using a carrierless electrophoresis method or the like. It is desirable that the metallic single-walled carbon nanotubes and the semiconducting single-walled carbon nanotubes which have not been dispersed using ultrasonic treatment be separated and removed using ultracentrifugation as in this example embodiment.

Although the concentration of the dispersant contained in the dispersion liquid DL in which the single-walled carbon nanotubes are dispersed is evaluated in this example embodiment, a concentration of a dispersant contained in any dispersion liquid may be evaluated as long as the dispersion liquid DL is a dispersion liquid DL in which nanocarbons are dispersed.

For example, a concentration of a dispersant contained in a dispersion liquid in which semiconducting single-walled carbon nanotubes are dispersed may be evaluated and a concentration of a dispersant contained in a dispersion liquid in which metallic single-walled carbon nanotubes are dispersed may be evaluated.

Also, a concentration of a dispersant contained in a dispersion liquid of semiconducting single-walled carbon nanotubes separated from a dispersion liquid containing single-walled carbon nanotubes and a dispersion liquid may be evaluated.

Furthermore, a concentration of a dispersant contained in a dispersion liquid of metallic single-walled carbon nanotubes separated from a dispersion liquid containing single-walled carbon nanotubes and a dispersion liquid may be evaluated.

Although the single-walled carbon nanotube mixture (eDIPS single-walled carbon nanotubes) is dispersed in the dispersion medium obtained by dissolving Brij S100 and measured in this example embodiment, other nanocarbons may be dispersed in a dispersion medium obtained by dissolving another dispersant and measured. Even when another dispersant or other nanocarbons are used, separation is possible if a spectrum of the dispersant and a spectrum of the nanocarbons are different. Thus, it is possible to measure a concentration of the dispersant.

Although an absorption spectrum is fitted in an energy range near 5.2 eV in this example embodiment, an absorption spectrum derived from nanocarbons is not limited to an energy range near 5.2 eV as long as the absorption spectrum can be fitted. For example, the absorption spectrum may be in an energy range near 4.0 eV. In this case, the absorption spectrum may be subjected to fitting treatment with respect to a peak derived from other nanocarbons seen near 4.3 eV.

Modified Examples

In this example embodiment, a measurement unit 10 converts a wavelength λ into an energy E and transmits a curve of energy dependence of an absorbance of a dispersion liquid DL to an analysis unit 20 as an absorption spectrum SP of the dispersion liquid DL. As a modified example, the measurement unit 10 may transmit a curve of wavelength dependence of an absorbance of a dispersion liquid DL as an absorption spectrum to the analysis unit 20 without, converting a wavelength λ0 into an energy E.

A measurement device 1 in this example embodiment includes a fitting unit 23. As a modified example, when a base curve BS does not change, the measurement device 1 may have the base curve BS stored therein in advance without the fitting unit 23 being included.

A separation unit 24 in this example embodiment separates an absorption spectrum SP1 of a dispersant from the absorption spectrum SP of the dispersion liquid DL As modified example, the absorption spectrum SP of the dispersion liquid DL may be separated into the absorption spectrum SP1 of the dispersant and an absorption spectrum of carbon nanotubes. In this case, an absorption spectrum obtained by subtracting the absorption spectrum SP1 of the dispersant from the absorption spectrum SP of the dispersion liquid DL is separated as an absorption spectrum of carbon nanotubes. Alternatively, an absorption spectrum obtained by subtracting a curve obtained by adding an extrapolation line to the absorption spectrum SP1 of the dispersant from the absorption spectrum SP of the dispersion liquid DL may be separated as an absorption spectrum of carbon nanotubes.

In each of the above-described example embodiments, a program configured to realize part or all of the functions of the measurement device (for example, a function of an analysis unit) may be recorded on a computer-readable recording medium, and processing of each unit may be performed by causing a computer system to read and execute the program recorded on this recording medium. The "computer system" mentioned herein includes an operating system (OS) and hardware such as peripheral devices.

The "computer system" also includes a homepage providing environment (or a display environment) when a world wide web (WWW) system is used.

Also, the "computer-readable recording medium" refers to a storage device such as a portable medium such as a flexible medium, a magneto-optical disk, a read only memory (ROM), and a compact disk (CD)-ROM and a hard disk built into a computer system. The "computer-readable recording medium" also includes a medium which dynamically holds a program for a short time like a communication line when a program is transmitted via a network such as the Internet and a communication circuit such as a telephone circuit and a medium which holds a program for a certain period of time like a volatile memory inside a computer system which serves as a server or a client at this time. Furthermore, the above-described program may be for realizing part of the above-described functions and may be used as long as the above-described functions can be realized through a combination of the above-described program and a program recorded in a computer system in advance.

Although the example embodiments of the present invention have been described in detail above with reference to the drawings, the specific constitution is not limited to the above-described example embodiments and includes design changes and the like without departing from the gist of the present invention.

INDUSTRIAL APPLICABILITY

The above-described measurement device, measurement method, and program allow a concentration of a dispersant of a nanocarbon dispersion liquid to be evaluated easily.

REFERENCE SYMBOLS

1 Measurement device
10 Measurement unit
20 Analysis unit
21 Reception unit
22 Memory unit
23 Fitting unit
24 Separation unit
25 Calculation unit
26 Output unit
BS Base curve
DL Dispersion liquid
L1 Irradiation light
L2 Detection light
SP Absorption spectrum of dispersion liquid
SP1 Absorption spectrum of dispersant.

The invention claimed is:

1. A measurement device, comprising:
a sensor configured to measure an absorption spectrum of a dispersion liquid in which nanocarbons are dispersed, the dispersion liquid including a dispersant;
a memory configured to store instructions; and
a processor configured to execute the instructions to:
separate an absorption spectrum of the dispersant from the absorption spectrum of the dispersion liquid; and
calculate a concentration of the dispersant from the absorption spectrum of the dispersant.

2. The measurement device according to claim 1, wherein the processor is further configured to execute the instructions to fit an absorption spectrum in an energy range including a π plasmon absorption peak near 5.2 eV.

3. The measurement device according to claim 1, wherein the processor is configured to execute the instructions to separate the absorption spectrum of the dispersion liquid into the absorption spectrum of the dispersant and an absorption spectrum of the nanocarbons.

4. The measurement device according to claim 1, wherein the processor is configured to execute the instructions to acquire a fitting straight line or a fitting curve indicating an absorbance with respect to the concentration of the dispersant.

5. A measurement method, comprising:
measuring an absorption spectrum of a dispersion liquid in which nanocarbons are dispersed, the dispersion liquid including a dispersant;
separating an absorption spectrum of the dispersant from the absorption spectrum of the dispersion liquid; and
calculating a concentration of the dispersant from the absorption spectrum of the dispersant.

6. A non-transitory computer-readable recording medium storing a program causing a computer of a measurement device including a sensor which is configured to measure an absorption spectrum of a dispersion liquid in which nanocarbons are dispersed to execute:

separating an absorption spectrum of a dispersant from the absorption spectrum of the dispersion liquid, the dispersion liquid including the dispersant; and     calculating a concentration of the dispersant from the absorption spectrum of the dispersant.

7. The measurement device according to claim 1, wherein the dispersion liquid is a liquid in which the nanocarbons and a dispersion medium are dispersed, and     the dispersant disperses the nanocarbons in the dispersion medium.

8. The measurement device according to claim 1, wherein the dispersant includes a surfactant.

9. The measurement device according to claim 1, wherein the dispersant includes a nonionic surfactant.

10. The measurement method according to claim 5, wherein the dispersion liquid is a liquid in which the nanocarbons and a dispersion medium are dispersed, and     the dispersant disperses the nanocarbons in the dispersion medium.

11. The measurement method according to claim 5, wherein the dispersant includes a surfactant.

12. The measurement method according to claim 5, wherein the dispersant includes a nonionic surfactant.

\* \* \* \* \*